United States Patent
Sato et al.

(10) Patent No.: US 10,820,179 B2
(45) Date of Patent: Oct. 27, 2020

(54) CONTROL APPARATUS AND COMMUNICATION TERMINAL

(71) Applicant: SONY CORPORATION, Tokyo (JP)

(72) Inventors: Masanori Sato, Tokyo (JP); Katsutoshi Itoh, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/453,888

(22) Filed: Jun. 26, 2019

(65) Prior Publication Data

US 2019/0320308 A1 Oct. 17, 2019

Related U.S. Application Data

(63) Continuation of application No. 14/904,831, filed as application No. PCT/JP2014/068641 on Jul. 11, 2014, now Pat. No. 10,375,550.

(30) Foreign Application Priority Data

Jul. 18, 2013 (JP) .................................. 2013-149127
Nov. 1, 2013 (JP) .................................. 2013-228833

(51) Int. Cl.
*H04W 4/80* (2018.01)
*H04W 76/14* (2018.01)
(Continued)

(52) U.S. Cl.
CPC ............. *H04W 4/80* (2018.02); *H04W 76/14* (2018.02); *H04W 88/06* (2013.01); *H04W 4/023* (2013.01);
(Continued)

(58) Field of Classification Search
CPC ... H04W 76/023; H04W 84/18; H04W 28/16; H04W 8/005; H04W 4/80; H04W 76/14;
(Continued)

(56) References Cited

U.S. PATENT DOCUMENTS 8,934,437 B2 * 1/2015 Li .......................... H04W 24/10
370/329
9,203,579 B2 * 12/2015 Chambers .......... H04B 10/1143
(Continued)

FOREIGN PATENT DOCUMENTS

CN 1716946 A 1/2006
CN 101496430 A 7/2009
(Continued)

OTHER PUBLICATIONS

Office Action for JP Patent Application No. 2015-527286, dated Jul. 10, 2018, 06 pages of Office Action and 03 pages of English Translation.
(Continued)

*Primary Examiner* — Matthew C Sams
(74) *Attorney, Agent, or Firm* — Chip Law Group

(57) ABSTRACT

A control apparatus transmits a confirmation request to confirm whether a direct communication is possible to each terminal as a target of the direct communication. Each terminal confirms whether the direct communication is possible and transmits the confirmation result to the control apparatus. The control apparatus judges whether the direct communication is possible based on the confirmation result transmitted from the terminal and when judging as possible, transmits a switch request for the direct communication to the terminal side. Consequently, a situation where a communication cannot actually be established when switching to the direct communication can be avoided.

12 Claims, 7 Drawing Sheets

(51) Int. Cl.
  *H04W 88/06* (2009.01)
  *H04W 92/18* (2009.01)
  *H04W 4/02* (2018.01)
  *H04W 76/23* (2018.01)
  *H04W 12/00* (2009.01)

(52) U.S. Cl.
  CPC ...... *H04W 12/00503* (2019.01); *H04W 76/23* (2018.02); *H04W 92/18* (2013.01)

(58) Field of Classification Search
  CPC ..... H04W 88/06; H04W 76/23; H04W 4/023; H04W 92/18; H04L 67/1061; H04L 67/1063; H04L 67/1068
  See application file for complete search history.

(56) References Cited

U.S. PATENT DOCUMENTS

| | | | | |
|---|---|---|---|---|
| 9,961,711 | B2* | 5/2018 | Sato | H04W 76/23 |
| 2006/0031437 | A1* | 2/2006 | Chambers | H04B 10/1143 |
| | | | | 709/223 |
| 2006/0165035 | A1* | 7/2006 | Chandra | H04W 28/16 |
| | | | | 370/329 |
| 2006/0252369 | A1* | 11/2006 | Rasanen | H04B 7/18558 |
| | | | | 455/39 |
| 2008/0062899 | A1 | 3/2008 | Huang et al. | |
| 2008/0186901 | A1* | 8/2008 | Itagaki | H04W 92/18 |
| | | | | 370/315 |
| 2009/0232109 | A1* | 9/2009 | Nandagopalan | H04W 16/28 |
| | | | | 370/336 |
| 2011/0228666 | A1 | 9/2011 | Barbieri et al. | |
| 2011/0258313 | A1* | 10/2011 | Mallik | H04W 8/005 |
| | | | | 709/224 |
| 2011/0282989 | A1 | 11/2011 | Geirhofer et al. | |
| 2013/0252654 | A1* | 9/2013 | Dimou | H04W 76/14 |
| | | | | 455/509 |
| 2013/0301438 | A1* | 11/2013 | Li | H04W 4/90 |
| | | | | 370/252 |
| 2013/0336230 | A1* | 12/2013 | Zou | H04W 72/085 |
| | | | | 370/329 |
| 2014/0057670 | A1* | 2/2014 | Lim | H04W 8/005 |
| | | | | 455/509 |
| 2014/0194115 | A1* | 7/2014 | Yang | H04W 52/0219 |
| | | | | 455/426.1 |
| 2014/0213221 | A1* | 7/2014 | Chai | H04W 72/0493 |
| | | | | 455/411 |
| 2015/0245272 | A1* | 8/2015 | Lindoff | H04W 48/06 |
| | | | | 370/332 |
| 2016/0029424 | A1* | 1/2016 | Li | H04W 24/10 |
| | | | | 370/329 |
| 2016/0150434 | A1 | 5/2016 | Abinader, Jr. et al. | |
| 2016/0165654 | A1* | 6/2016 | Sato | H04W 76/15 |
| | | | | 370/328 |
| 2016/0198503 | A1* | 7/2016 | Sato | H04W 88/06 |
| | | | | 455/422.1 |

FOREIGN PATENT DOCUMENTS

| | | |
|---|---|---|
| CN | 102812772 A | 12/2012 |
| CN | 102893657 A | 1/2013 |
| CN | 102972050 A | 3/2013 |
| EP | 1768312 A1 | 3/2007 |
| JP | 06-085739 A | 3/1994 |
| JP | 2001-238264 A | 8/2001 |
| JP | 2008-503116 A | 1/2008 |
| JP | 2011-172113 A | 9/2011 |
| JP | 2013-523018 A | 6/2013 |
| JP | 2013-526157 A | 6/2013 |
| JP | 2013-529032 A | 7/2013 |
| KR | 10-2007-0026682 A | 3/2007 |
| KR | 10-2013-0010083 A | 1/2013 |
| KR | 10-2013-0039735 A | 4/2013 |
| WO | 2006/002579 A1 | 1/2006 |
| WO | 2011/116017 A1 | 9/2011 |
| WO | 2011/130623 A2 | 10/2011 |
| WO | 2011/143496 A1 | 11/2011 |

OTHER PUBLICATIONS

Office Action for CN Patent Application No. 201480039420.9, dated Jul. 24, 2018, 09 pages of Office Action and 25 pages of English Translation.
Extended European Search Report of EP Patent Application No. 14825701.7, dated Jan. 25, 2017, 07 pages.
Non-Final Office Action for U.S. Appl. No. 14/904,831, dated Sep. 25, 2017, 16 pages.
Non-Final Office Action for U.S. Appl. No. 14/904,831, dated Aug. 16, 2018, 17 pages.
Final Office Action for U.S. Appl. No. 14/904,831, dated Apr. 24, 2018, 14 pages.
Final Office Action for U.S. Appl. No. 14/904,831, dated Dec. 26, 2018, 18 pages.
Advisory Action for U.S. Appl. No. 14/904,831, dated Jun. 29, 2018, 04 pages.
Advisory Action for U.S. Appl. No. 14/904,831, dated Feb. 27, 2019, 03 pages.
Notice of Allowance for U.S. Appl. No. 14/904,831, dated Mar. 29, 2019, 9 pages.
International Preliminary Report on Patentability of PCT Application No. PCT/JP2014/068641, dated Jan. 19, 2016, 11 pages of English Translation and 05 pages of IPRP.
International Search Report and Written Opinion of PCT Application No. PCT/JP2014/068641, dated Oct. 14, 2014, 08 pages of English Translation and 11 pages of ISRWO.

* cited by examiner

| Management number | Terminal ID | Dedicated terminal | User setting | Terminal mode | Direct communication wireless system (point) | Remaining battery level (point) | State of connection with base station (point) |
|---|---|---|---|---|---|---|---|
| 1 | 0001 | Yes | OK | Active | BT, WLAN (2) | 90% (9) | -20dBm (9) |
| 2 | 0401 | No | OK | Sleep | BT, WLAN (2) | 70% (7) | -50dBm (6) |
| 3 | 5002 | Yes | OK | Active | WLAN (1) | 20% (2) | -70dBm (4) |
| 4 | 0600 | No | OK | Active | BT, WLAN, Mesh (3) | 90% (9) | -30dBm (8) |
| 5 | 7762 | No | NG | Active | WLAN (1) | 80% (8) | -40dBm (7) |
| ... | ... | ... | ... | ... | ... | ... | ... |

FIG.10

CONTROL APPARATUS AND COMMUNICATION TERMINAL

CROSS REFERENCE TO RELATED APPLICATIONS

The present application is a continuation of U.S. patent application Ser. No. 14/904,831, filed on Jan. 13, 2016, which is a National Stage of PCT/JP2014/068641, filed on Jul. 11, 2014, which claims the benefit of priority from Japanese Patent Application No. JP 2013-228833, filed in the Japan Patent Office on Nov. 1, 2013 and from Japanese Patent Application No. JP 2013-149127, filed in the Japan Patent Office on Jul. 18, 2013. Each of the above-referenced applications is hereby incorporated herein by reference in its entirety.

TECHNICAL FIELD

The present technique relates to a control apparatus and a communication terminal, more specifically, to a control apparatus that controllably switches direct communications among terminals, etc.

BACKGROUND ART

Mobile communications that use public networks typified by cellular phones have widely prevailed for their conveniences. In public networks, a terminal can wirelessly connect to a base station to use various network services such as the Internet via networks of providers. Moreover, services based on connections among terminals, such as telephone calls, file exchanges, and games, can also be used.

Since the public network and terminals are connected wirelessly (communication using such a connection will be referred to as "network communication"), a capacity of a wireless segment becomes insufficient due to an increase in the number of terminals connected to the public network to lower a service quality (e.g., unable to connect, communication speed is lowered, etc.), which is a problem. Further, since data of many terminals needs to be processed, problems of capacity shortages and line congestions arise also in the base station and core networks.

In a public network system, even services based on connections among proximate terminals use communications via the base station and core networks.

On the other hand, in recent years, in addition to a wireless system of connecting to public networks, other wireless systems (e.g., wireless LAN) that enable a direct communication between proximate terminals are being adopted in terminals (direct communication between terminals using this wireless system will be referred to as "direct communication").

For example, Patent Document 1 discloses a method of switching from a communication that uses a public network to a direct communication. The method of determining a terminal to perform a direct communication involves estimating a distance between terminals based on positional information of the terminals estimated by a base station and estimating an electrical field intensity of the terminals when the direct communication is performed based on the estimated distance, to judge whether the direct communication is possible.

Patent Document 1: Japanese Patent Application Laid-open No. 2001-238264

SUMMARY OF INVENTION

Problems to be Solved by the Invention

Regarding those that judge whether a direct communication is possible based on a distance between terminals as described above, an erroneous judgment may be caused when there is a shielding object between the terminals, and thus there is a fear that a situation where a communication cannot actually be established even when switched to a direct communication may occur. Further, since frequency characteristics used in a direct communication is not taken into account, an erroneous judgment may be caused due to influences of a diffraction, reflection, and the like that differ depending on a frequency band, and thus there is a fear that a situation where a communication cannot actually be established even when switched to a direct communication may occur.

The present technique aims at favorably making a switch to a direct communication.

Means for Solving the Problems

According to a general idea of the present technique, there is provided a control apparatus including:
a connection request reception section configured to receive, from a first communication terminal, a request for a connection to a second communication terminal;
a confirmation request transmission section configured to transmit a confirmation request to confirm whether a direct communication is possible to the first communication terminal and the second communication terminal;
a confirmation result reception section configured to receive a confirmation result from at least one of the first communication terminal and the second communication terminal;
a judgment section configured to judge, based on the confirmation result, whether the direct communication between the first communication terminal and the second communication terminal is possible; and
a switch request transmission section configured to transmit, when it is judged that the direct communication is possible, a switch request for the direct communication to the first communication terminal and the second communication terminal.

In the present technique, a connection request with respect to the second communication terminal is received from the first communication terminal by the connection request reception section. Here, the number of second communication terminal is not limited to one, and a plurality of second communication terminals may be provided. The confirmation request transmission section transmits a confirmation request to confirm whether a direct communication is possible to the first communication terminal and the second communication terminal.

For example, the control apparatus may further include a system selection section configured to select, from information in a database, a direct communication wireless system to be used in common by the first communication terminal and the second communication terminal, and the confirmation request transmission section may transmit, when performing the selection of a direct communication wireless system to be used in common by the first communication terminal and the second communication terminal, a confirmation request to confirm whether the direct communication is possible to the first communication terminal and the second communication terminal. When there is no direct communication wireless system to be used in common by the first communication terminal and the second communication terminal, a direct communication between the first communication terminal and the second communication terminal is impossible from the beginning. Therefore, it is possible to avoid a situation where the confirmation request to confirm whether the direct communication is possible is wastefully transmitted to the first communication terminal and the second communication terminal.

Furthermore, for example, information for confirming whether the direct communication is possible, that includes at least information on the direct communication wireless system and identification information of a counterpart terminal, may be inserted into the confirmation request transmitted by the confirmation request transmission section. In this case, for example, the confirmation request may include timing information that indicates a communication timing for confirming whether the direct communication is possible between the first communication terminal and the second communication terminal. Moreover, in this case, for example, the confirmation request may include a parameter unique to the selected direct communication wireless system. By inserting the information for confirming whether the direct communication is possible into the confirmation request as described above, processing for a communication for confirming whether the direct communication is possible on the communication terminal side, such as a measurement of a reception electrical field intensity, can be carried out efficiently.

The confirmation result reception section receives the confirmation result from the first communication terminal and/or the second communication terminal. For example, the confirmation result may be a measurement value of the reception electrical field intensity at a time a signal transmitted from the counterpart communication terminal is received. The judgment section judges, based on the confirmation result, whether a direct communication between the first communication terminal and the second communication terminal is possible. For example, the reception electrical field intensity is compared with a minimum reception electrical field intensity in the judgment.

When it is judged that the direct communication is possible, the switch request transmission section transmits a switch request for the direct communication to the first communication terminal and the second communication terminal. For example, the switch request may include at least information on the direct communication wireless system and identification information of the counterpart terminal. In this case, for example, the switch request may include timing information that indicates a switch timing to the direct communication. Also in this case, for example, the switch request may include a parameter unique to the selected direct communication wireless system. By incorporating various types of information into the switch request as described above, a switch to the direct communication can be performed easily and appropriately on the communication terminal side.

Further, for example, the control apparatus may further include a base unit determination section configured to determine, when it is judged by the judgment section that the direct communication between the first communication terminal and the second communication terminal is possible, a base unit that also simultaneously connects with the base station out of the first communication terminal and the second communication terminal, and the switch request transmitted by the switch request transmission section may include information on the determined base unit. Accordingly, a selection setting of the base unit on the communication terminal side becomes easy.

As described above, in the present technique, the confirmation request to confirm whether the direct communication is possible is transmitted to the communication terminal side and when judged that the direct communication is possible based on the confirmation result transmitted from the communication terminal side in response to the confirmation request, the switch request for the direct communication is transmitted to the communication terminal side. Therefore, it is possible to avoid a situation where a communication cannot actually be established even when switched to the direct communication and favorably carry out the switch to the direct communication.

It should be noted that in the present technique, for example, the control apparatus may further include a vicinity confirmation section configured to confirm whether the first communication terminal and the second communication terminal are in the vicinity of each other, and the confirmation request transmission section may transmit, when it is confirmed that the first communication terminal and the second communication terminal are in the vicinity of each other, a confirmation request to confirm whether the direct communication is possible to the first communication terminal and the second communication terminal. In this case, for example, the vicinity confirmation section may confirm whether the first communication terminal and the second communication terminal are in the vicinity of each other based on whether the first communication terminal and the second communication terminal are connected to the same base station or whether the first communication terminal and the second communication terminal are connected to either the same base station or proximate base stations.

When the first communication terminal and the second communication terminal are not in the vicinity, for example, it is highly likely that the direct communication between the first communication terminal and the second communication terminal is judged as impossible based on the relationship of the reception electrical field intensities. Therefore, by transmitting the confirmation request to confirm whether the direct communication is possible only when the first communication terminal and the second communication terminal are in the vicinity, a wasteful transmission of the confirmation request can be suppressed.

Further, according to another general idea of the present technique, there is provided a communication terminal including:
a confirmation request reception section configured to receive, from a control apparatus, a confirmation request to confirm whether a direct communication between the own terminal and another communication terminal is possible;
a confirmation section configured to confirm, when receiving the confirmation request, whether the direct communication between the own terminal and the another communication terminal is possible;
a confirmation result transmission section configured to transmit a result of the confirmation to the control apparatus;
a switch request reception section configured to receive, from the control apparatus, a switch request for switching to the direct communication between the own terminal and the another communication terminal; and
a communication control section configured to switch the own terminal to the direct communication with the another communication terminal when receiving the switch request.

In the present technique, the confirmation request reception section receives the confirmation request to confirm whether the direct communication is possible between the own terminal and the another communication terminal from the control apparatus. For example, the control apparatus may further include a communication request transmission section configured to transmit a communication request with respect to the another communication terminal to the control apparatus. As a result of transmitting such a communication request to the control apparatus, a confirmation request is transmitted from the control apparatus. Upon receiving the confirmation request, the confirmation section confirms whether the direct communication between the own terminal and the another communication terminal is possible.

For example, information for confirming whether the direct communication is possible, that includes at least information on a direct communication wireless system and identification information of the another communication terminal, is inserted into the confirmation request. In this case, for example, the confirmation request may include timing information that indicates a communication timing for confirming whether the direct communication with the another communication terminal is possible. Also in this case, for example, the confirmation request may include a parameter unique to the direct communication wireless system. By inserting the information for confirming whether the direct communication is possible into the confirmation request as described above, processing for a communication for confirming whether the direct communication is possible, such as a measurement of a reception electrical field intensity, can be carried out efficiently.

The confirmation result transmission section transmits the confirmation result to the control apparatus. For example, the confirmation result may include information on a measured reception electrical field intensity or information that indicates a fact that the reception electrical field intensity has been unable to be measured. The switch request reception section receives a switch request to switch to the direct communication between the own terminal and the another communication terminal from the control apparatus. The switch control section makes a switch to the direct communication between the own terminal and the another communication terminal upon receiving the switch request.

For example, the switch request may include at least information on a direct communication wireless system and identification information of the another communication terminal. In this case, for example, the switch request may include timing information that indicates a switch timing to the direct communication. Also in this case, for example, the switch request may include a parameter unique to the direct communication wireless system. By incorporating various types of information into the switch request as described above, a switch to the direct communication can be performed easily and appropriately.

Moreover, for example, the switch request may further include information on a base unit that also simultaneously connects with a base station, the base unit being determined from the own communication terminal and the another communication terminal. As a result, a selection setting of the base unit when performing the direct communication becomes easy.

Effect of the Invention

According to the present technique, the switch to the direct communication can be performed favorably. It should be noted that the effects described herein are not necessarily limited, and any of the effects described in the present disclosure may be attained.

BRIEF DESCRIPTION OF DRAWINGS

FIG. 10
A diagram showing an example of performance of each terminal stored in a database.

MODES FOR CARRYING OUT THE INVENTION

Hereinafter, structures for embodying the present technique (hereinafter, referred to as "embodiments") will be described. It should be noted that the descriptions will be given in the following order.
1. Embodiment
2. Modified example 1. Embodiment

Figure 1:
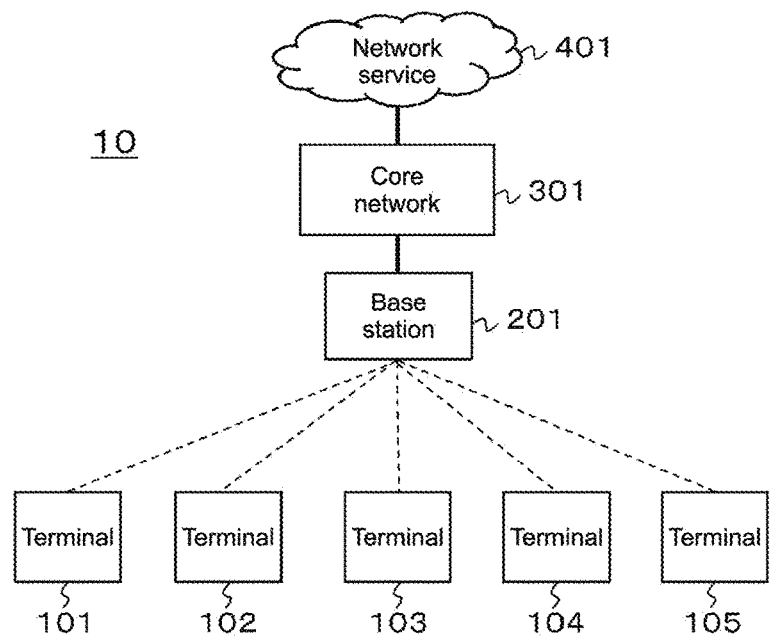
FIG. 1
A block diagram showing a structural example of a communication system as an embodiment.

[Structural Example of Communication System]
FIG. 1 is a block diagram showing a structural example of a communication system 10 as an embodiment. The communication system 10 includes communication terminals 101 to 105, a base station 201, a core network 301, and a network service 401. The communication terminals 101 to 105 are wirelessly connected to the base station 201. Hereinafter, the "communication terminal" will be referred to as "terminal" as appropriate.

When the communication terminal 101 communicates with the network service 401 in this state, for example, the communication is performed via the base station 201 and the core network 301. Also when the communication terminal 101 communicates with the communication terminal 102 in this state, for example, the communication is performed via the base station 201 and the core network 301.

Figure 2:
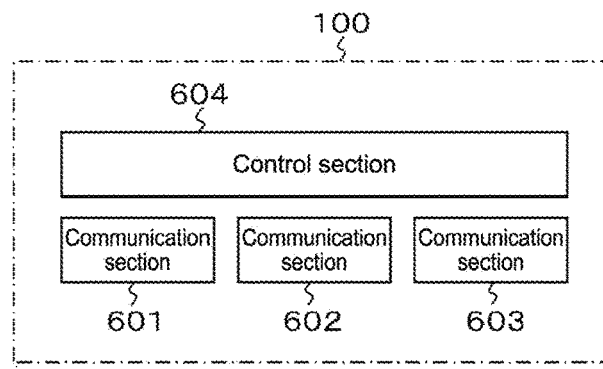
FIG. 2
A block diagram showing a structural example of a communication terminal.

FIG. 2 shows a structural example of the communication terminal 100 (communication terminals 101 to 105). The communication terminal 100 includes a plurality of, three in the example shown in the figure, communication sections 601 to 603. One communication section, that is, the communication section 601, for example, is a communication section for 3G (3rd Generation cellular phone), LTE (Long Term Evolution), and the like that are used for connecting with the base station 201. Other communication sections, that is, the communication sections 602 and 603, for example, are communication sections for a wireless LAN, Bluetooth, and the like that are used for a direct communication. The communication terminal 100 also includes a control section 604. The control section 604 controls a wireless communication via the communication sections 601 to 603 and performs cooperative control among the communication sections.

Figure 3:
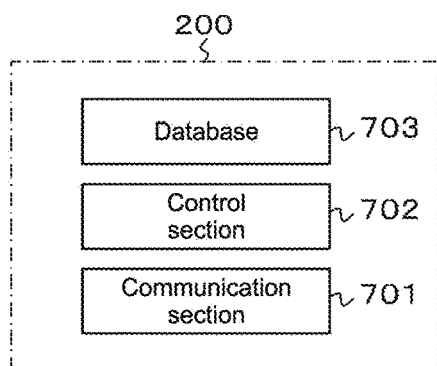
FIG. 3
A diagram showing a structural example of a control apparatus (base station and core network).

FIG. 3 shows a structural example of a control apparatus 200 (base station 201 and core network 301). The control apparatus 200 includes a communication section 701, a control section 702, and a database 703. The communication section 701 is a communication section used for connecting with terminals. The control section 702 exchanges information with the database 703 as well as control a wireless communication via the communication section 701. The database 703 stores terminal information.

A relationship among the base station 201 and the core network 301 shown in FIG. 1 and the communication section 701, the control section 702, and the database 703 shown in FIG. 3 is a mounting dependency. For example, the communication section 701 and the control section 702 are provided in the base station 201, and the database 703 is provided in the core network 301.

[Method for Control Apparatus to Grasp Direct Communication Wireless System of Terminals]

Figure 4:
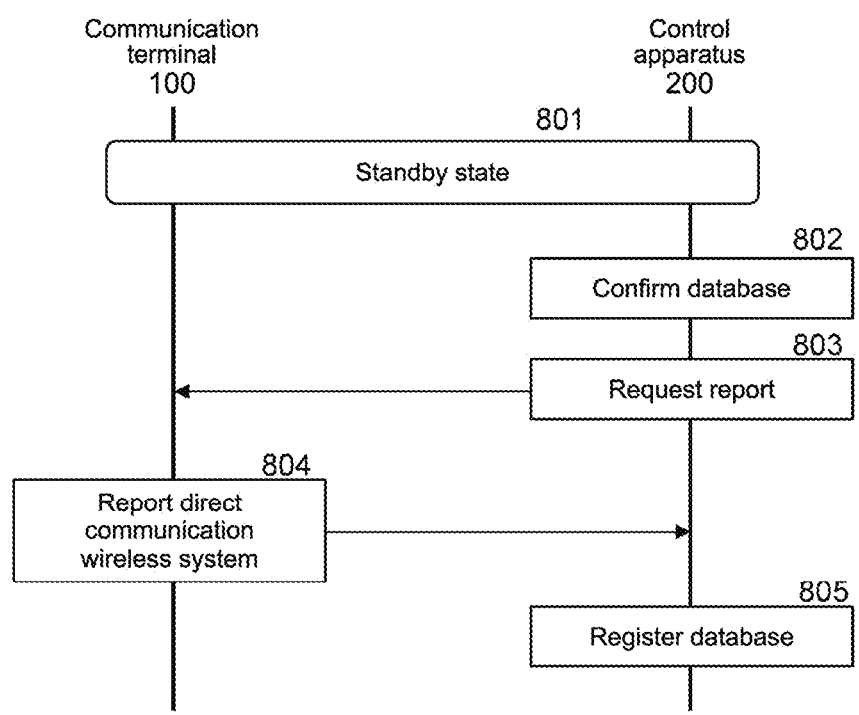
FIG. 4
A diagram for explaining processing carried out in a case where a direct communication system of the communication terminal is to be grasped by the control apparatus.

A method for the control apparatus 200 to grasp a direct communication wireless system of the terminals will be described. The sequence diagram shown in FIG. 4 shows processing in a case where the control apparatus 200 grasps the direct communication wireless system of the communication terminal 100. It should be noted that the same processing is applied to the communication terminals 101 to 105 in the communication system 10.

The communication terminal 100 (communication terminals 101 to 105) connects to the control apparatus 200 after power is turned on to be put to a standby state (Step 801). Specific descriptions of this procedure will be omitted since the procedure is the same as that of generally-used cellular phones.

The control apparatus 200 grasps an ID of the communication terminal 100 in the standby state. For example, the ID corresponds to an ID unique to a terminal, such as IMEI and IMSI. Based on the ID, the control apparatus 200 confirms information on the direct communication wireless system of the communication terminal 100 stored in the database 703 (Step 802).

When the information on the direct communication wireless system of the communication terminal 100 is not stored in the database 703 or when a certain time period has elapsed, the control apparatus 200 requests the communication terminal 100 to report the direct communication wireless system (Step 803).

The communication terminal 100 requested to report reports a corresponding direct communication wireless system (Step 804). Here, information to be reported is a wireless system, a corresponding frequency, processing performance, transmission power, a minimum receivable electrical field intensity, a usability, a remaining battery level, and the like.

The control apparatus 200 that has received the report from the communication terminal 100 stores the information in the database 703 (Step 805).

It should be noted that although the control apparatus 200 has requested the report from the communication terminal 100 in the descriptions above, the report may be made from the communication terminal 100. For example, the report is made from the communication terminal 100 when a usability condition is changed by a user, for example. The control apparatus 200 that has received the report updates the information stored in the database 703.

[Method for Control Apparatus to Judge Whether Direct Communication Between Terminals is Possible]

Figure 5:
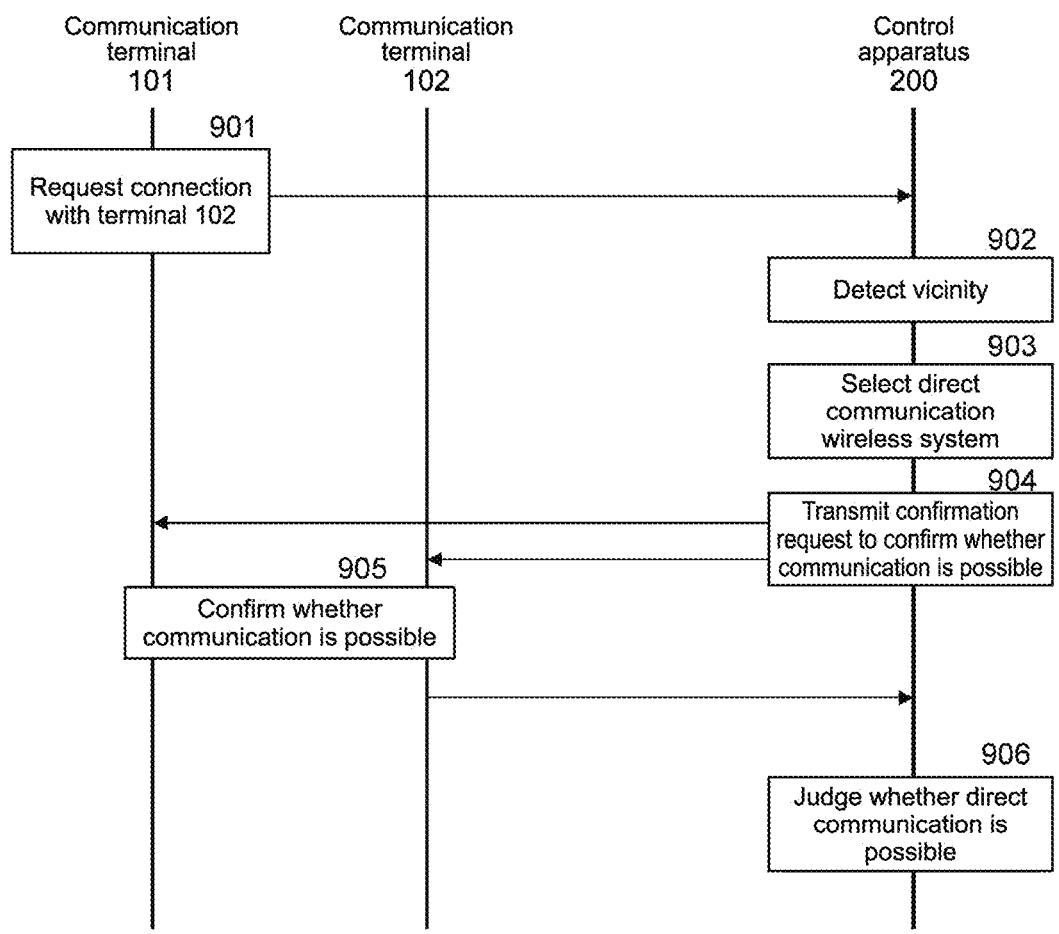
FIG. 5
A diagram for explaining processing of the control apparatus for judging whether a direct communication between terminals (two terminals) is possible.

A method for the control apparatus 200 to judge whether a direct communication between the terminals is possible will be described. First, a judgment method for two terminals will be described. The sequence diagram shown in FIG. 5 shows processing for the control apparatus 200 to judge whether a direct communication between the terminals is possible. Here, a case where the two terminals are the communication terminal 101 and the communication terminal 102 will be described.

The communication terminal 101 requests a connection with the communication terminal 102 to the control apparatus 200 (Step 901). Examples of the case of transmitting a connection request include a case where the communication terminal 101 makes a phone call to the communication terminal 102, a case where text data such as an email is transmitted, and a case where a request is made to start a text messaging service such as a chat.

The control apparatus 200 confirms (detects) that the terminals are in the vicinity of each other (Step 902). For example, the confirmation on whether the terminals are in the vicinity is made based on whether the terminals are connected to the same base station. Moreover, for example, the confirmation on whether the terminals are in the vicinity is made based on whether the terminals are connected to either the same base station or proximate base stations. The proximate base stations are base stations within 1 km radius, for example, and are not limited to adjacent base stations.

The control apparatus 200 confirms the information in the database 703 based on the IDs of the terminals (ID of communication terminal that has requested connection and ID of counterpart communication terminal) and selects a direct communication wireless system to be used in common by the terminals (Step 903). Then, the control apparatus 200 transmits, to the terminals, a request to confirm whether a direct communication is possible using the selected direct communication wireless system (Step 904).

Information for the terminals to confirm whether a direct communication is possible is inserted into the confirmation request. For example, the confirmation request includes the selected direct communication wireless system, a measurement time (start time and measurement period), IDs of measurement target terminals, and a parameter unique to the direct communication wireless system. Here, the measurement time indicates a timing to confirm whether a direct communication between the terminals is possible. The measurement target is the communication terminal 101 that has requested the connection and the counterpart communication terminal 102.

The measurement target terminal ID is, for example, a MAC address or a device name. The parameter unique to the direct communication wireless system is, for example, a usable frequency, a function designation in a wireless LAN (Access point or Station, or Wi-Fi Direct), an identifier (SSID) in the wireless LAN, and a function designation in Bluetooth (BT) (terminal that issues inquiry command or terminal that stands by and responds). It should be noted that "Bluetooth" is a registered trademark.

The terminal that has received the communication confirmation request from the control apparatus 200 confirms whether a direct communication is possible based on the information included in the request (Step 905). The confirmation method differs depending on the selected direct communication wireless system. The following examples will be described.

(Example 1) Case where functions of AP and STA are designated in wireless LAN
(Example 2) Case where Wi-Fi Direct is designated in wireless LAN
(Example 3) Case where BT is selected
(Example 4) Case where Mesh is selected Example 1

A case where a wireless LAN is selected as the direct communication wireless system and functions of an AP and an STA are designated will be described. For example, it is assumed that the communication terminal 101 is the AP (Access Point) and the communication terminal 102 is the STA (Station).

The communication terminal 101 operates as the AP for a designated measurement time. Specifically, signals called beacon are cyclically transmitted within a designated frequency. AN SSID (Service Set Identifier) as an identifier in the wireless LAN is imparted to the beacon, the SSID capable of being read by the reception terminal. A MAC address of the communication terminal 101 is also imparted to the beacon, the MAC address also capable of being read by the reception terminal.

The communication terminal 102 operates as the STA for the designated measurement time. Specifically, the communication terminal 102 receives beacons within the designated frequency and measures an electrical field intensity. The communication terminal 102 can judge that the beacon having the designated MAC address and SSID out of the received beacons corresponds to the measurement target terminal.

The communication terminal 102 reports the measured electrical field intensity to the control apparatus 200 as the confirmation result after an elapse of the designated measurement time. It should be noted that when a counterpart is not found within the designated measurement time and the electrical field intensity eventually cannot be measured, the communication terminal 102 reports "unable to be measured" to the control apparatus 200 as the confirmation result after an elapse of the designated measurement time.

The control apparatus 200 compares, upon receiving the report on the measured electrical field intensity from the communication terminal 102, the reported electrical field intensity and a minimum receivable electrical field intensity stored in the database 703 and judges whether a direct communication is possible (Step 906). When the reported electrical field intensity is larger than the minimum receivable electrical field intensity of both the communication terminals 101 and 102 stored in the database 703, for example, the control apparatus 200 judges that a direct communication is possible. It should be noted that when receiving the report "unable to be measured" from the communication terminal 102, the control apparatus 200 immediately judges that a direct communication is impossible.

It should be noted that although the communication terminal 102 measures and reports the reception electrical field intensity in the descriptions above, a procedure in which the STA transmits a probe request to the AP and the AP transmits a probe response to the STA as a response to the request is defined as a general function of the wireless LAN. Such a procedure is called active scan.

By the communication terminal 102 as the STA executing the active scan within the designated measurement time, the communication terminal 101 as the AP can measure the reception electrical field intensity upon receiving the probe request, and the communication terminal 102 as the STA can measure the reception electrical field intensity upon receiving the probe response.

In this case, the communication terminal 101 and the communication terminal 102 reports, as the confirmation result, the measured electrical field intensities to the control apparatus 200 after an elapse of the designated measurement time. It should be noted that when the communication terminal 101 and the communication terminal 102 are unable to find a counterpart within the designated measurement time and thus the electrical field intensities cannot be measured, the communication terminal 101 and the communication terminal 102 report "unable to be measured" to the control apparatus 200 as the confirmation result after an elapse of the designated measurement time.

Upon receiving the report on the measured electrical field intensities from the communication terminal 101 and the communication terminal 102, the control apparatus 200 compares the electrical field intensities reported from the terminals with the minimum receivable electrical field intensities stored in the database to judge whether a direct communication is possible (Step 906). When the electrical field intensity reported from the communication terminal 101 is larger than the minimum receivable electrical field intensity of the communication terminal 101 stored in the database 703 and the electrical field intensity reported from the communication terminal 102 is larger than the minimum receivable electrical field intensity of the communication terminal 102 stored in the database 703, for example, the control apparatus 200 judges that the direct communication is possible. It should be noted that when receiving the report "unable to be measured" from at least one of the communication terminal 101 and the communication terminal 102, the control apparatus 200 immediately judges that the direct communication is impossible.

Further, as another method, by exchanging the settings of the function designation of the wireless LAN as one of the parameters in the confirmation request of Step 904 regarding the communication terminal 101 and the communication terminal 102, the communication terminal 101 can report the measured electrical field intensity or the fact "unable to be measured" to the control apparatus 200 as the confirmation result. Accordingly, the control apparatus 200 can acquire information on the measured reception electrical field intensities from both the communication terminal 101 and the communication terminal 102 or the information on the fact "unable to be measured".

Then, when the measured electrical field intensities are reported from the communication terminal 101 and the communication terminal 102, the control apparatus 200 judges that the direct communication is possible in a case where the electrical field intensity reported from the communication terminal 101 is larger than the minimum receivable electrical field intensity of the communication terminal 101 stored in the database 703 and the electrical field intensity reported from the communication terminal 102 is larger than the minimum receivable electrical field intensity of the communication terminal 102 stored in the database 703, for example. It should be noted that when the report "unable to be measured" is received from at least one of the communication terminal 101 and the communication terminal 102, the control apparatus 200 immediately judges that the direct communication is impossible.

Example 2

A case where the wireless LAN is selected as the direct communication wireless system and Wi-Fi Direct is designated will be described. In Wi-Fi Direct, the communication terminal 101 and the communication terminal 102 are allocated with equivalent functions. The specification defines that each communication terminal transmit a probe request and the terminal that has received the probe request transmit a probe response. Therefore, it is possible to measure the reception electrical field intensity in both the communication terminal 101 and the communication terminal 102.

In this case, each of the communication terminal 101 and the communication terminal 102 reports, as the confirmation result, the measured electrical field intensity to the control apparatus 200 after an elapse of the designated measurement time. It should be noted that when unable to find a counterpart within the designated measurement time and the electrical field intensity cannot therefore be measured, each of the communication terminal 101 and the communication terminal 102 reports, as the confirmation result, the fact "unable to be measured" to the control apparatus 200 after an elapse of the designated measurement time.

Upon receiving the report on the measured electrical field intensity from the communication terminal 101 and the communication terminal 102, the control apparatus 200 compares the electrical field intensity reported from each terminal with the minimum receivable electrical field intensity stored in the database 703 and judges whether the direct communication is possible (Step 906). The judgment criteria in this case are the same as those of the case where the measured electrical field intensity is reported to the control apparatus 200 from both the communication terminal 101 and the communication terminal 102 when the wireless LAN described above is selected. It should be noted that when the report "unable to be measured" is received from at least one of the communication terminal 101 and the communication terminal 102, the control apparatus 200 immediately judges that the direct communication is impossible.

Example 3

A case where BT is selected as the direct communication wireless system will be described. In BT, the specification defines that one of the terminals transmit an inquiry command, and the terminal that has received the inquiry command respond to the command. The communication terminal 101 and the communication terminal 102 can each measure the reception electrical field intensity by receiving the inquiry command and a response thereto.

In this case, the communication terminal 101 and the communication terminal 102 each report, as the confirmation result, the measured electrical field intensity to the control apparatus 200 after an elapse of the designated measurement time. It should be noted that when unable to find a counterpart within the designated measurement time and the electrical field intensity cannot therefore be measured, the communication terminal 101 and the communication terminal 102 each report, as the confirmation result, the fact "unable to be measured" to the control apparatus 200 after an elapse of the designated measurement time.

Upon receiving the report on the measured electrical field intensity from the communication terminal 101 and the communication terminal 102, the control apparatus 200 compares the electrical field intensity reported from each terminal with the minimum receivable electrical field intensity stored in the database 703 and judges whether the direct communication is possible (Step 906). The judgment criteria in this case are the same as those of the case where the measured electrical field intensity is reported to the control apparatus 200 from both the communication terminal 101 and the communication terminal 102 when the wireless LAN described above is selected. It should be noted that when the report "unable to be measured" is received from at least one of the communication terminal 101 and the communication terminal 102, the control apparatus 200 immediately judges that the direct communication is impossible.

Example 4

A case where Mesh is selected as the direct communication wireless system will be described. In Mesh, the specification defines that each terminal cyclically transmit a beacon. Each terminal is capable of receiving beacons of other terminals during a time the own terminal is not transmitting a beacon. Therefore, the communication terminal 101 and the communication terminal 102 can each measure the reception electrical field intensity.

In this case, the communication terminal 101 and the communication terminal 102 each report, as the confirmation result, the measured electrical field intensity to the control apparatus 200 after an elapse of the designated measurement time. It should be noted that when unable to find a counterpart within the designated measurement time and the electrical field intensity cannot therefore be measured, the communication terminal 101 and the communication terminal 102 each report, as the confirmation result, the fact "unable to be measured" to the control apparatus 200 after an elapse of the designated measurement time.

Upon receiving the report on the measured electrical field intensity from the communication terminal 101 and the communication terminal 102, the control apparatus 200 compares the electrical field intensity reported from each terminal with the minimum receivable electrical field intensity stored in the database 703 and judges whether the direct communication is possible (Step 906). The judgment criteria in this case are the same as those of the case where the measured electrical field intensity is reported to the control apparatus 200 from both the communication terminal 101 and the communication terminal 102 when the wireless LAN described above is selected. It should be noted that when the report "unable to be measured" is received from at least one of the communication terminal 101 and the communication terminal 102, the control apparatus 200 immediately judges that the direct communication is impossible.

Figure 6:
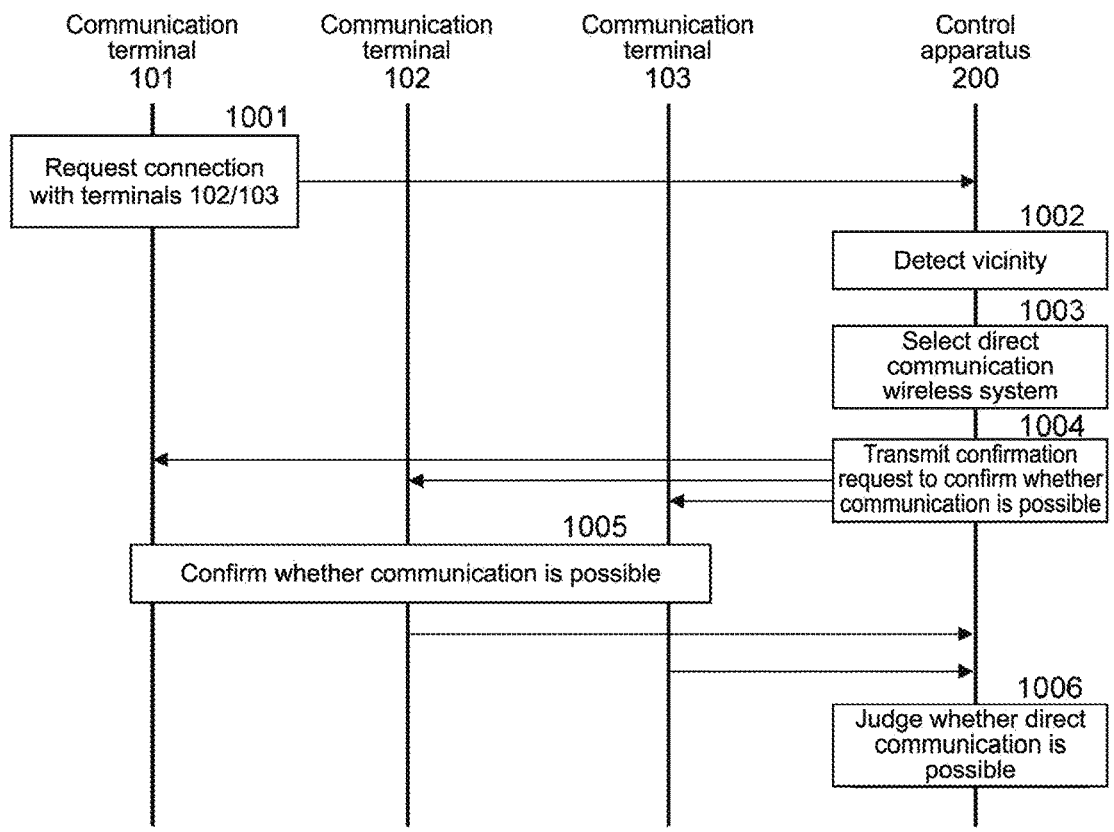
FIG. 6
A diagram for explaining processing of the control apparatus for judging whether a direct communication among terminals (three terminals) is possible.

Next, the judgment method in the case of three or more terminals will be described. The sequence diagram shown in FIG. 6 shows processing for the control apparatus 200 to judge whether a direct communication among terminals is possible. Here, the case where the terminals are the communication terminal 101, the communication terminal 102, and the communication terminal 103, that is, three terminals, will be described.

The communication terminal 101 transmits, to the control apparatus 200, a connection request with respect to the communication terminal 102 and the communication terminal 103 (Step 1001). Examples of the case of transmitting a connection request include a case where the communication terminal 101 makes a 3-way call to the communication terminal 102 and the communication terminal 103 and a case where a request is made to start a text messaging service such as a chat by a plurality of people.

The control apparatus 200 confirms (detects) that the terminals are in the vicinity of one another (Step 1002). For example, the confirmation on whether the terminals are in the vicinity is made based on whether the terminals are connected to the same base station. Moreover, for example, the confirmation on whether the terminals are in the vicinity is made based on whether the terminals are connected to either the same base station or proximate base stations. The proximate base stations are base stations within 1 km radius, for example, and are not limited to adjacent base stations.

The control apparatus 200 confirms the information in the database 703 based on the IDs of the terminals (ID of communication terminal that has requested connection and IDs of counterpart communication terminals) and selects a direct communication wireless system to be used in common by the terminals (Step 1003). Then, the control apparatus 200 transmits, to the terminals, a request to confirm whether a direct communication is possible using the selected direct communication wireless system (Step 1004).

Information for the terminals to confirm whether a direct communication is possible is inserted into the confirmation request. For example, the confirmation request includes the selected direct communication wireless system, a measurement time (start time and measurement period), IDs of measurement target terminals, and a parameter unique to the direct communication wireless system. Here, the measurement time indicates a timing to confirm whether a direct communication among the terminals is possible. The measurement target is the communication terminal 101 that has requested the connection and the counterpart communication terminal 102 and communication terminal 103.

The measurement target terminal ID is, for example, a MAC address or a device name. The parameter unique to the direct communication wireless system is, for example, a usable frequency, a function designation in a wireless LAN (Access point or Station, or Wi-Fi Direct), an identifier (SSID) in the wireless LAN, and a function designation in Bluetooth (BT) (terminal that issues inquiry command or terminal that stands by and responds).

The terminal that has received the communication confirmation request from the control apparatus 200 confirms whether a direct communication is possible based on the information included in the request (Step 1005). The confirmation method differs depending on the selected direct communication wireless system. The following examples will be described.
(Example 1) Case where functions of AP and STA are designated in wireless LAN
(Example 2) Case where Wi-Fi Direct is designated in wireless LAN
(Example 3) Case where BT is selected
(Example 4) Case where Mesh is selected Example 1

A case where a wireless LAN is selected as the direct communication wireless system and the functions of AP and STA are designated will be described. For example, it is assumed that the communication terminal 101 is the AP (Access Point) and the communication terminal 102 and the communication terminal 103 are each the STA (Station).

The communication terminal 101 operates as the AP for a designated measurement time. Specifically, signals called beacon are cyclically transmitted within a designated frequency. AN SSID (Service Set Identifier) as an identifier in the wireless LAN is imparted to the beacon, the SSID capable of being read by the reception terminal. A MAC address of the communication terminal 101 is also imparted to the beacon, the MAC address also capable of being read by the reception terminal.

The communication terminal 102 and the communication terminal 103 each operate as the STA for the designated measurement time. Specifically, the communication terminal 102 and the communication terminal 103 each receive beacons within the designated frequency and measure an electrical field intensity. The communication terminal 102 and the communication terminal 103 can judge that the beacon having the designated MAC address and SSID out of the received beacons corresponds to the measurement target terminal.

The communication terminal 102 and the communication terminal 103 each report the measured electrical field intensity to the control apparatus 200 as the confirmation result after an elapse of the designated measurement time. It should be noted that when a counterpart is not found within the designated measurement time and the electrical field intensity eventually cannot be measured, the communication terminal 102 and the communication terminal 103 report "unable to be measured" to the control apparatus 200 as the confirmation result after an elapse of the designated measurement time.

In the descriptions above, the communication terminal 102 and the communication terminal 103 are each capable of measuring a reception electrical field intensity with respect to the communication terminal 101. Next, the function designation in the wireless LAN as one of the parameters in the confirmation request of Step 1004 is changed, the communication terminal 103 and the communication terminal 101 each measure the reception electrical field intensity with respect to the communication terminal 102, and the communication terminal 101 and the communication terminal 102 each measure the reception electrical field intensity with respect to the communication terminal 103. As a result, the communication terminal 101, the communication terminal 102, and the communication terminal 103 each measure the reception electrical field intensity with respect to the other two terminals. Each terminal reports, as the confirmation result, the measured electrical field intensity or the fact "unable to be measured" to the control apparatus 200.

The control apparatus 200 compares, upon receiving the reports on the measured electrical field intensities from all the communication terminals, each of the reported electrical field intensities and a minimum receivable electrical field intensity stored in the database 703 and judges whether a direct communication is possible (Step 1006). When a minimum report value of the electrical field intensities reported from the communication terminal 101 is larger than the minimum receivable electrical field intensity of the communication terminal 101, a minimum report value of the electrical field intensities reported from the communication terminal 102 is larger than the minimum receivable electrical field intensity of the communication terminal 102, and a minimum report value of the electrical field intensities reported from the communication terminal 103 is larger than the minimum receivable electrical field intensity of the communication terminal 103, for example, the control apparatus 200 judges that a direct communication is possible. It should be noted that when receiving the report "unable to be measured" from at least one of the communication terminals, the control apparatus 200 immediately judges that a direct communication is impossible.

It should be noted that although the functions of the terminals are repetitively changed for the measurements in the descriptions above, a procedure called active scan in which the STA transmits a probe request to the AP and the AP transmits a probe response to the STA as a response to the request is defined as a general function of the wireless LAN.

By the communication terminal 102 and the communication terminal 103 each as the STA executing the active scan within the designated measurement time, the communication terminal 101 as the AP can measure the reception electrical field intensities upon receiving the probe requests from the communication terminal 102 and the communication terminal 103, and the communication terminal 102 and the communication terminal 103 each as the STA can measure the reception electrical field intensities upon receiving the probe response.

In this case, the control apparatus 200 is capable of receiving reports on the reception electrical field intensities from the communication terminal 101, the communication terminal 102, and the communication terminal 103 with less confirmation requests than in the method described above in which the control apparatus 200 transmits the confirmation request three times with the three terminals being the APs. Specifically, the control apparatus 200 is capable of receiving the reports on the reception electrical field intensities from the communication terminal 101, the communication terminal 102, and the communication terminal 103 by transmitting the confirmation request twice. It should be noted that in the case of three or more terminals (e.g., N terminals), the confirmation request only needs to be transmitted (N−1) times in this method. The control apparatus 200 compares the reported electrical field intensities with the minimum receivable electrical field intensities stored in the database 703 and judges whether the direct communication is possible as described above (Step 1006).

Example 2

A case where the wireless LAN is selected as the direct communication wireless system and Wi-Fi Direct is designated will be described. In Wi-Fi Direct, the communication terminal 101, the communication terminal 102, and the communication terminal 103 are allocated with equivalent functions. The specification defines that each communication terminal transmit a probe request and the terminal that has received the probe request transmit a probe response. Therefore, it is possible to measure the reception electrical field intensities in all of the communication terminal 101, the communication terminal 102, and the communication terminal 103.

In this case, each of the communication terminal 101, the communication terminal 102, and the communication terminal 103 reports, as the confirmation result, the measured electrical field intensities to the control apparatus 200 after an elapse of the designated measurement time. It should be noted that when unable to find a counterpart within the designated measurement time and the electrical field intensities cannot therefore be measured, each of the communication terminal 101, the communication terminal 102, and the communication terminal 103 reports, as the confirmation result, the fact "unable to be measured" to the control apparatus 200 after an elapse of the designated measurement time.

Upon receiving the reports on the measured electrical field intensities from all of the communication terminals, the control apparatus 200 compares the electrical field intensities reported from the terminals with the minimum receivable electrical field intensities stored in the database 703 and judges whether the direct communication is possible (Step 1006). The judgment criteria in this case are the same as those of the case where the measured electrical field intensities are reported to the control apparatus 200 from the communication terminal 101, the communication terminal 102, and the communication terminal 103 when the wireless LAN described above is selected. It should be noted that when the report "unable to be measured" is received from at least one of the communication terminals, the control apparatus 200 immediately judges that the direct communication is impossible.

Example 3

A case where BT is selected as the direct communication wireless system will be described. In BT, the specification defines that one of the terminals transmit an inquiry command, and the terminal that has received the inquiry command respond to the command. By the communication terminal 101 transmitting the inquiry command and the communication terminal 102 and the communication terminal 103 responding to the command, the communication terminal 101 can measure the reception electrical field intensities with respect to the communication terminal 102 and the communication terminal 103, and the communication terminal 102 and the communication terminal 103 can measure the reception electrical field intensities with respect to the communication terminal 101.

Next, by designating the communication terminal 102 or the communication terminal 103 as the terminal that transmits the inquiry command and carrying out the same procedure, all the terminals can measure the electrical field intensities with respect to the other terminals. In this case, the communication terminal 101, the communication terminal 102, and the communication terminal 103 each report, as the confirmation result, the measured electrical field intensities to the control apparatus 200 after an elapse of the designated measurement time. It should be noted that when unable to find a counterpart within the designated measurement time and the electrical field intensities cannot therefore be measured, the communication terminal 101, the communication terminal 102, and the communication terminal 103 each report, as the confirmation result, the fact "unable to be measured" to the control apparatus 200 after an elapse of the designated measurement time.

Upon receiving the reports on the measured electrical field intensities from all the communication terminals, the control apparatus 200 compares the electrical field intensities reported from the terminals with the minimum receivable electrical field intensities stored in the database 703 and judges whether the direct communication is possible (Step 1006). The judgment criteria in this case are the same as those of the case where the measured electrical field intensities are reported to the control apparatus 200 from the communication terminal 101, the communication terminal 102, and the communication terminal 103 when the wireless LAN described above is selected. It should be noted that when the report "unable to be measured" is received from at least one of the communication terminals, the control apparatus 200 immediately judges that the direct communication is impossible.

Example 4

A case where Mesh is selected as the direct communication wireless system will be described. In Mesh, the specification defines that each terminal cyclically transmit a beacon. Each terminal is capable of receiving beacons of other terminals during a time the own terminal is not transmitting a beacon. Therefore, the communication terminal 101, the communication terminal 102, and the communication terminal 103 can each measure the reception electrical field intensities.

In this case, the communication terminal 101, the communication terminal 102, and the communication terminal 103 each report, as the confirmation result, the measured electrical field intensities to the control apparatus 200 after an elapse of the designated measurement time. It should be noted that when unable to find a counterpart within the designated measurement time and the electrical field intensities cannot therefore be measured, the communication terminal 101, the communication terminal 102, and the communication terminal 103 each report, as the confirmation result, the fact "unable to be measured" to the control apparatus 200 after an elapse of the designated measurement time.

Upon receiving the reports on the measured electrical field intensities from all the communication terminals, the control apparatus 200 compares the electrical field intensities reported from the terminals with the minimum receivable electrical field intensities stored in the database 703 and judges whether the direct communication is possible (Step 1006). The judgment criteria in this case are the same as those of the case where the measured electrical field intensities are reported to the control apparatus 200 from the communication terminal 101, the communication terminal 102, and the communication terminal 103 when the wireless LAN described above is selected. It should be noted that when the report "unable to be measured" is received from at least one of the communication terminals, the control apparatus 200 immediately judges that the direct communication is impossible.

[Method of Switching to Direct Communication Between Terminals]

A method of switching to a direct communication between terminals will be described. The control apparatus 200 requests the terminal that has been judged as capable of performing the direct communication to switch to the direct communication. Hereinafter, the procedure will be described.

Figure 7:
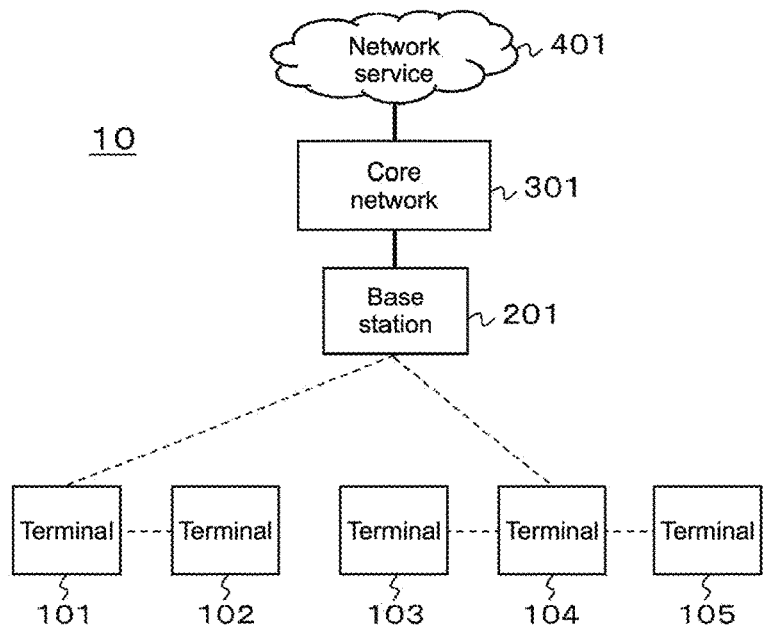
FIG. 7
A diagram showing an example of a system structure when switching to the direct communication.

FIG. 7 shows an example of a system structure when switching to the direct communication. In this example, the communication terminal 101 and the communication terminal 102 are performing the direct communication, and the communication terminal 104, the communication terminal 103, and the communication terminal 105 are also performing the direct communication. Further, the communication terminal 101 and the communication terminal 104 communicate with the base station 201 at the same time. In this example, the communication terminal 101 and the communication terminal 102 are in the vicinity of each other, and the communication terminal 103, the communication terminal 104, and the communication terminal 105 are in the vicinity of one another.

Here, the communication terminals that communicate with the base station 201 (communication terminal 101 and communication terminal 104) will each be referred to as "base unit". On the other hand, the communication terminals that perform a direct communication without communicating with the base station 201 will each be referred to as "sub-unit".

Figure 8:
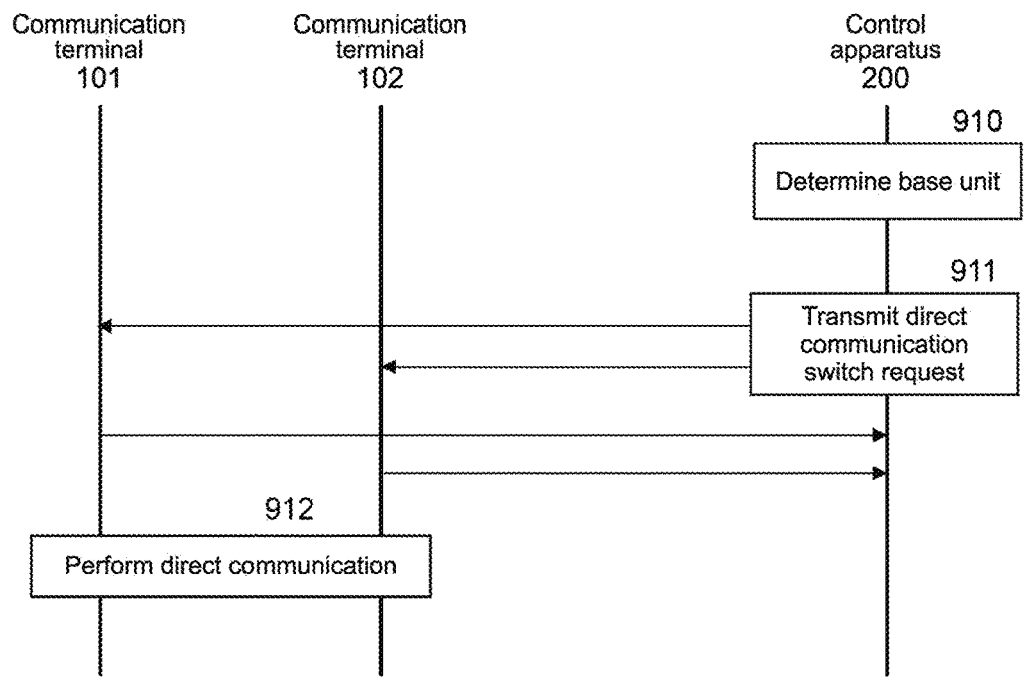
FIG. 8
A diagram for explaining processing of switching the two terminals to the direct communication.
Figure 9:
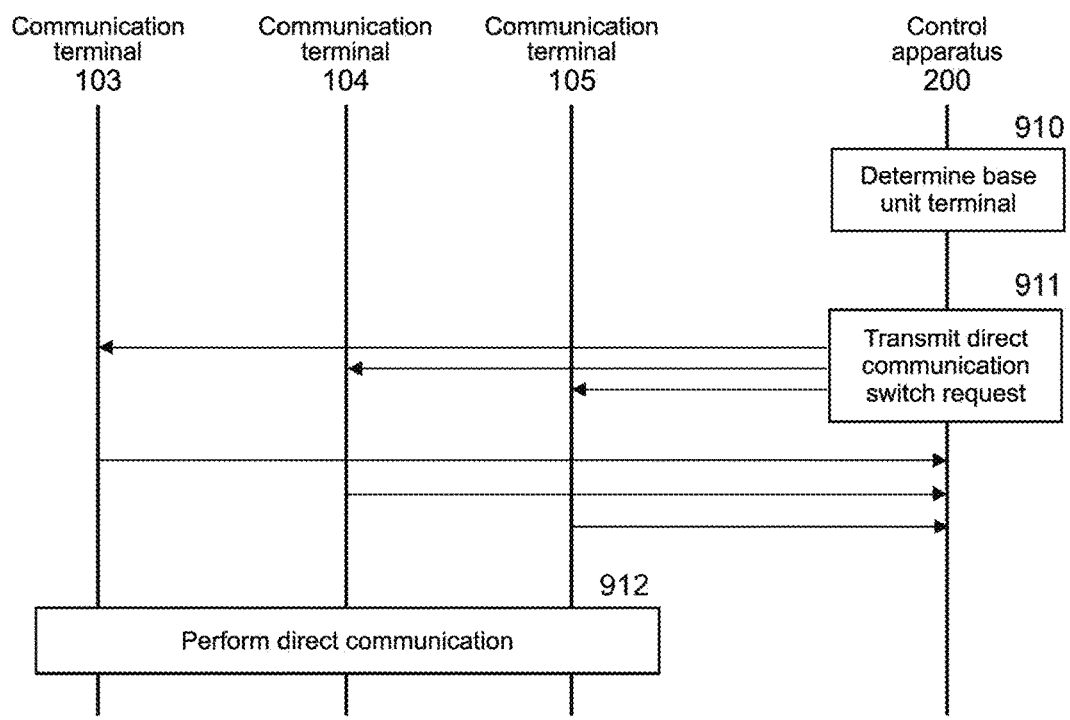
FIG. 9
A diagram for explaining processing of switching the three terminals to the direct communication.

The sequence diagram shown in FIG. 8 shows processing of switching the communication terminal 101 and the communication terminal 102 to the direct communication. Moreover, the sequence diagram shown in FIG. 9 shows processing of switching the communication terminal 103, the communication terminal 104, and the communication terminal 105 to the direct communication. The difference between FIGS. 8 and 9 is the number of terminals to which the control apparatus 200 transmits a direct communication switch request. Therefore, the following descriptions will be made based on FIG. 8.

The control apparatus 200 determines a base unit (Step 910). The base unit is a communication terminal that performs a direct communication as well as simultaneously communicate with the base station 201. The communication terminal 101 and the communication terminal 104 shown in FIG. 7 correspond to the base unit.

For example, the control apparatus 200 preferentially selects a predetermined dedicated terminal as the base unit, such as a dedicated terminal that is prepared by a business operator and operates as a relay terminal of a proximate terminal in a case where lines are congested due to disasters and the like. For example, the control apparatus 200 selects the base unit based on remaining battery levels of the communication terminals. Alternatively, the control apparatus 200 selects a terminal that can favorably connect to the base station 201 as the base unit, for example.

Alternatively, for example, the control apparatus 200 selects the base unit based on the communication terminal settings. For example, the control apparatus 200 selects the base unit based on information that a user has preset to indicate whether the terminal is permitted or not. In this case, to prompt the user to permit, a method of applying a discount of a monthly fee when permitted is conceivable. It should be noted that the determination of the control apparatus 200 is prioritized in an emergency.

Alternatively, for example, the control apparatus 200 selects a terminal having more supporting direct communication wireless systems as the base unit. Alternatively, for example, the control apparatus 200 preferentially selects a terminal in an active mode as the base unit. In other words, a terminal in a sleep mode is not selected as the base unit.

An example of the judgment criteria of the plurality of items described above for selecting the base unit will be described. As described above, the control apparatus 200 can grasp the performance of the communication terminals and store the result in the database 703 (see FIG. 4). FIG. 10 shows an example of the performance of each terminal stored in a database 703.

The "management number" is a number allocated for the purpose of management of the database 703. The "terminal ID" is a number for identifying a communication terminal. This number is unique to the terminal, and an example thereof is a MAC address. In the figure, 4-digit numbers are shown in a broad transcription. The "dedicated terminal" indicates whether the terminal is a dedicated terminal.

The "user setting" is an item that indicates whether the terminal is to be used as the base unit set by the user. The "terminal mode" indicates which of the active mode and the sleep mode the connection state of the communication terminal and the base station 201 is in. The "direct communication wireless system" indicates the direct communication wireless system that the communication terminal supports. The numerical values in the parentheses each indicate a priority degree in determining the base unit, and the numerical value becomes larger as the number of supporting direct communication wireless systems increases.

The "remaining battery level" indicates the remaining battery level of the terminal. The numerical values in the parentheses each indicate the priority degree in determining the base unit, and the numerical value becomes larger as the remaining battery level becomes higher. The "state of connection with base station" indicates a communication quality (reception electrical field intensity) with respect to the base station 201. The numerical values in the parentheses each indicate the priority degree in determining the base unit, and the numerical value becomes larger as the communication quality becomes higher.

Figure 11:
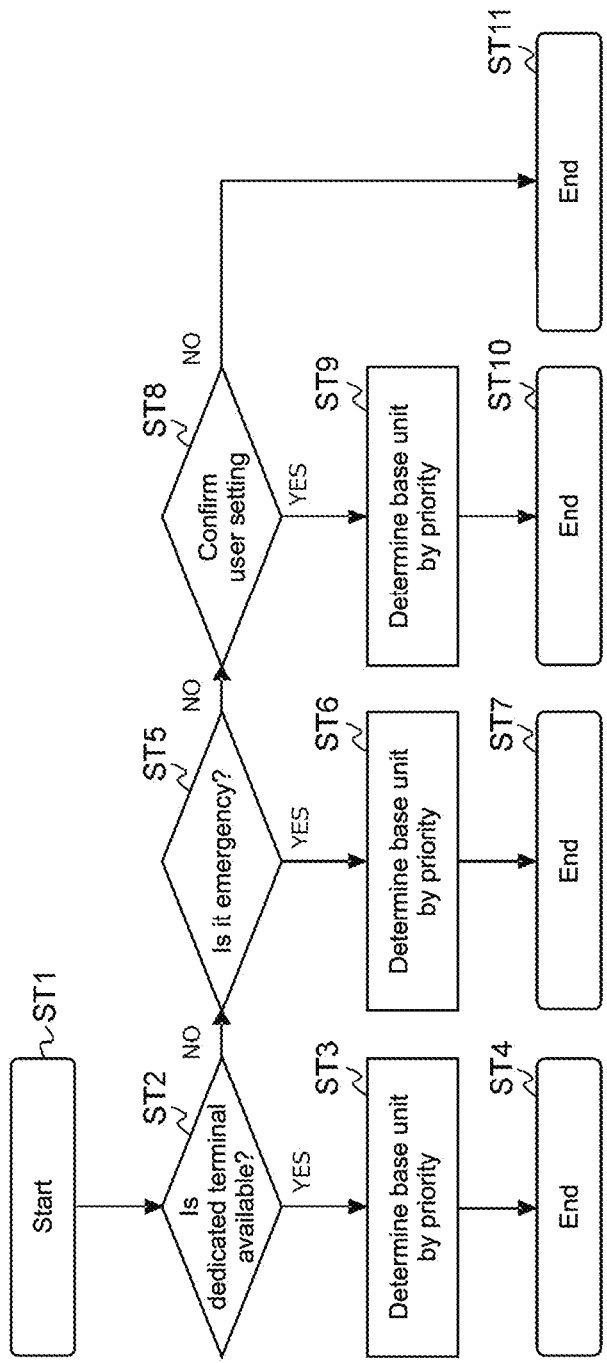
FIG. 11
A flowchart showing an example of a processing procedure for determining a base unit in the control apparatus.

The flowchart of FIG. 11 shows an example of the processing procedure for the control apparatus 200 to determine the base unit. The control apparatus 200 starts the processing in Step ST1 and advances to Step ST2 after that. In Step ST2, the control apparatus 200 confirms whether a dedicated terminal is available.

The control apparatus 200 references the database 703 and confirms the items of the dedicated terminal, the user setting, and the terminal mode to judge the availability. When the dedicated terminal is "Yes", the user setting is "OK", and the terminal mode is "active", it is judged as available. When judged that there is an available terminal in Step ST2, the control apparatus 200 advances to Step ST3.

In Step ST3, for the predetermined number of terminals, the control apparatus 200 sums up the numerical values (priorities) obtained by digitizing the direct communication wireless system, the remaining battery level, and the state of connection with base station and determines the terminal having a highest numerical value (priority) as the base unit. After that, the control apparatus 200 ends the processing in Step ST4.

If there is no available terminal in Step ST2, the control apparatus 200 advances to the processing of Step ST5. In Step ST5, the control apparatus 200 confirms whether it is an emergency. In the case of an emergency, the control apparatus 200 advances to Step ST6 while targeting all terminals irrelevant of the items of the dedicated terminal, the user setting, and the terminal mode in the database 703.

In Step ST6, for all the terminals, the control apparatus 200 sums up the numerical values (priorities) obtained by digitizing the direct communication wireless system, the remaining battery level, and the state of connection with base station and determines the terminal having a highest numerical value (priority) as the base unit. After that, the control apparatus 200 ends the processing in Step ST7.

When judged that it is not an emergency in Step ST5, the control apparatus 200 advances to the processing of Step ST8. In Step ST8, the control apparatus 200 confirms the user setting. When there is a terminal whose user setting is "OK", the control apparatus 200 advances to the processing of Step ST9. In Step ST9, for the predetermined number of terminals, the control apparatus 200 sums up the numerical values (priorities) obtained by digitizing the direct communication wireless system, the remaining battery level, and the state of connection with base station and determines the terminal having a highest numerical value (priority) as the base unit. After that, the control apparatus 200 ends the processing in Step ST10.

When there is no terminal whose user setting is "OK" in Step ST8, the control apparatus 200 immediately advances to Step S11 and ends the processing without selecting the base unit. It should be noted that when the base unit cannot be selected as described above, it is judged that the terminals communicate with the base station 201.

Referring back to FIG. 8, the control apparatus 200 transmits a direct communication switch request to the terminal that is to switch to the direct communication (Step 911). For example, the switch request includes an ID of a counterpart. Examples of the ID include a MAC address, an IP address, an IMEI, and an IMSI.

Further, for example, the switch request includes the determined base unit, the direct communication wireless system, the start time, the terminal IDs (MAC address, IMEI, etc.), parameters unique to the direct communication wireless system, and the like. Examples of the parameters unique to the direct communication wireless system include a usable frequency, a function designation in the wireless LAN (Access point or Station, or Wi-Fi Direct), an identifier (SSID) in the wireless LAN, and a function designation in Bluetooth (BT) (terminal that issues inquiry command or terminal that stands by and responds). The start time indicates a timing to switch to the direct communication.

The terminal that has received the switch request transmits a reception confirmation to the control apparatus 200. Each terminal starts a direct communication based on the information included in the switch request (Step 912). It should be noted that the details of the connection method using the direct communication will be omitted since they are generally used in all the wireless systems to be used.

As described above, in the communication system 10 shown in FIG. 1, the control apparatus 200 transmits a confirmation request to confirm whether a direct communication is possible to the terminal side and transmits, when judging that the direct communication is possible based on the confirmation result transmitted from the communication terminal side in response to the request, the switch request to switch to the direct communication to the communication terminal side (see Steps 904 to 906 in FIG. 5 and Steps 1004 to 1006 in FIG. 6). Therefore, for example, it is possible to avoid a situation where a communication cannot actually be established when switched to the direct communication, and a switch to the direct communication can therefore be performed favorably.

Moreover, in the communication system 10 shown in FIG. 1, the control apparatus 200 transmits, when it is confirmed that the terminals to be the targets of the direct communication are in the vicinity of each other, the confirmation request to confirm whether the direct communication is possible to each of the terminals (see Step 902 in FIG. 5 and Step 1002 in FIG. 6). When the terminals are not in the vicinity of each other, the possibility that the direct communication between the terminals becomes impossible becomes higher based on the relationship of the reception electrical field intensities, for example. Therefore, for example, wasteful transmissions of confirmation requests can be suppressed, and the processing of the control apparatus 200 can be made efficient.

Further, in the communication system 10 shown in FIG. 1, the control apparatus 200 transmits, when selecting the direct communication wireless system to be used in common by the terminals as the targets of the direct communication, the confirmation request to confirm whether the direct communication is possible to each of the terminals (see Step 903 in FIG. 5 and Step 1003 in FIG. 6). Therefore, for example, wasteful transmissions of confirmation requests can be suppressed, and the processing of the control apparatus 200 can be made efficient.

Furthermore, in the communication system 10 shown in FIG. 1, information for confirming whether the direct communication is possible, that includes at least the information on the direct communication wireless system and the identification information of the counterpart terminal, is inserted into the confirmation request that the control apparatus 200 transmits to each terminal. Therefore, for example, the terminals can efficiently carry out the processing for confirming whether the direct communication is possible, such as a measurement of the reception electrical field intensity.

Furthermore, in the communication system 10 shown in FIG. 1, the control apparatus 200 selects, from the terminals as targets of the direct communication, a base unit that also simultaneously connects with the base station 201. Therefore, for example, even when the terminals as the targets of the direct communication are in a direct communication environment, a network communication can be performed via the base unit as necessary.

2. Modified Example

It should be noted that although the embodiment of the present technique has been specifically described with reference to the attached drawings, the present technique is not limited to those examples. It is apparent that various modifications and corrections may be made within the technical idea described in the scope of claims by those having common knowledge in the field to which the technique pertains, and it is understood that those are also considered to pertain to the scope of the present technique. For example, although a cellular phone is assumed as the communication terminal, the terminal is not limited to the cellular phone, and mobile information processing apparatuses such as a PDA, a game device, and a compact PC may also be used. The present technique may also take the following structures.

(1) A control apparatus, including:

a connection request reception section configured to receive, from a first communication terminal, a request for a connection to a second communication terminal;

a confirmation request transmission section configured to transmit a confirmation request to confirm whether a direct communication is possible to the first communication terminal and the second communication terminal;

a confirmation result reception section configured to receive a confirmation result from at least one of the first communication terminal and the second communication terminal;

a judgment section configured to judge, based on the confirmation result, whether the direct communication between the first communication terminal and the second communication terminal is possible; and a switch request transmission section configured to transmit, when it is judged that the direct communication is possible, a switch request for the direct communication to the first communication terminal and the second communication terminal.

(2) The control apparatus according to (1) above, further including a vicinity confirmation section configured to confirm whether the first communication terminal and the second communication terminal are in the vicinity of each other, in which the confirmation request transmission section transmits, when it is confirmed that the first communication terminal and the second communication terminal are in the vicinity of each other, a confirmation request to confirm whether the direct communication is possible to the first communication terminal and the second communication terminal.

(3) The control apparatus according to (2) above, in which the vicinity confirmation section confirms whether the first communication terminal and the second communication terminal are in the vicinity of each other based on whether the first communication terminal and the second communication terminal are connected to the same base station or whether the first communication terminal and the second communication terminal are connected to either the same base station or proximate base stations.

(4) The control apparatus according to any one of (1) to (3) above, further including a system selection section configured to select, from information in a database, a direct communication wireless system to be used in common by the first communication terminal and the second communication terminal, in which the confirmation request transmission section transmits, when performing the selection of a direct communication wireless system to be used in common by the first communication terminal and the second communication terminal, a confirmation request to confirm whether the direct communication is possible to the first communication terminal and the second communication terminal.

(5) The control apparatus according to (4) above, in which information for confirming whether the direct communication is possible, that includes at least information on the direct communication wireless system and identification information of a counterpart terminal, is inserted into the confirmation request transmitted by the confirmation request transmission section.

(6) The control apparatus according to (5) above, in which the confirmation request transmitted by the confirmation request transmission section includes timing information that indicates a communication timing for confirming whether the direct communication is possible between the first communication terminal and the second communication terminal.

(7) The control apparatus according to (5) or (6) above, in which the confirmation request transmitted by the confirmation request transmission section includes a parameter unique to the selected direct communication wireless system.

(8) The control apparatus according to any one of (1) to (7) above, in which the switch request transmitted by the switch request transmission section includes at least information on a direct communication wireless system and identification information of a counterpart terminal.

(9) The control apparatus according to (8) above, in which the switch request transmitted by the switch request transmission section includes timing information that indicates a switch timing to the direct communication.

(10) The control apparatus according to (8) or (9) above, further including a system selection section configured to select, from information in a database, a direct communication wireless system to be used in common by the first communication terminal and the second communication terminal, in which the confirmation request transmission section transmits, when performing the selection of a direct communication wireless system to be used in common by the first communication terminal and the second communication terminal, a confirmation request to confirm whether the direct communication is possible to the first communication terminal and the second communication terminal, and in which the switch request transmitted by the switch request transmission section includes a parameter unique to the selected direct communication wireless system.

(11) The control apparatus according to any one of (8) to (10) above, further including a base unit determination section configured to determine, when it is judged by the judgment section that the direct communication between the first communication terminal and the second communication terminal is possible, a base unit that also simultaneously connects with the base station out of the first communication terminal and the second communication terminal, in which the switch request transmitted by the switch request transmission section includes information on the determined base unit.

(12) A communication terminal, including:

a confirmation request reception section configured to receive, from a control apparatus, a confirmation request to confirm whether a direct communication between the own terminal and another communication terminal is possible;

a confirmation section configured to confirm, when receiving the confirmation request, whether the direct communication between the own terminal and the another communication terminal is possible;

a confirmation result transmission section configured to transmit a result of the confirmation to the control apparatus;

a switch request reception section configured to receive, from the control apparatus, a switch request for switching to the direct communication between the own terminal and the another communication terminal; and a communication control section configured to switch the own terminal to the direct communication with the another communication terminal when receiving the switch request.

(13) The communication terminal according to (12) above, in which the confirmation result transmitted by the confirmation result transmission section includes information on a measured reception electrical field intensity or information that indicates a fact that the reception electrical field intensity has been unable to be measured.

(14) The communication terminal according to (12) or (13) above, in which information for confirming whether the direct communication is possible, that includes at least information on a direct communication wireless system and identification information of the another communication terminal, is inserted into the confirmation request received by the confirmation request reception section.

(15) The communication terminal according to (14) above, in which the confirmation request received by the confirmation request reception section includes timing information that indicates a communication timing for confirming whether the direct communication with the another communication terminal is possible.

(16) The communication terminal according to (14) or (15) above, in which the confirmation request received by the confirmation request reception section includes a parameter unique to the direct communication wireless system.

(17) The communication terminal according to any one of (12) to (16) above, in which the switch request received by the switch request reception section includes at least information on a direct communication wireless system and identification information of the another communication terminal.

(18) The communication terminal according to (17) above, in which the switch request received by the switch request reception section includes a parameter unique to the direct communication wireless system.

(19) The communication terminal according to (17) or (18) above, in which the switch request received by the switch request reception section includes information on a base unit that also simultaneously connects with a base station, the base unit being determined from the own communication terminal and the another communication terminal.

(20) The communication terminal according to any one of (12) to (19) above, further including a connection request transmission section configured to transmit, to the control apparatus, a request for a connection to the another communication terminal.

DESCRIPTION OF SYMBOLS/REFERENCE NUMERALS

10 communication system
100, 101-105 communication terminal
200 control apparatus
201 base station
301 core network
401 network service
601-603 communication section
604 control section
701 communication section
702 control section
703 database

The invention claimed is:

1. A control apparatus, comprising: a control section configured to:
    receive, from a first communication terminal, a connection request for a direct communication with a second communication terminal;
    compare a first electric field intensity of the first communication terminal and a second electric field intensity of the second communication terminal with a minimum receivable electric field intensity stored in a database;
    select, based on the comparison of the first electric field intensity and the second electric field intensity with the minimum receivable electric field intensity a direct communication wireless system common to the first communication terminal and the second communication terminal;
    transmit a confirmation request to the first communication terminal and the second communication terminal based on the selection of the direct communication wireless system, wherein the confirmation request indicates confirmation of possibility of the direct communication between the first communication terminal and the second communication terminal;
    receive a confirmation result from at least one of the first communication terminal or the second communication terminal, based on the confirmation request;
    determine, based on the confirmation result, the possibility of the direct communication between the first communication terminal and the second communication terminal;
    select, as a base unit, one of the first communication terminal or the second communication terminal based on a sum of a plurality of numerical values, wherein the plurality of numerical values is based on a number of a plurality of direct communication wireless systems that supports the direct communication between the first communication terminal and the second communication terminal, a state of connection between the first communication terminal and the second communication terminal, and a battery level of each of the first communication terminal and the second communication terminal; and transmit, based on the possibility of the direct communication and the selected base unit, a switch request to switch to the direct communication between the first communication terminal and the second communication terminal.

2. The control apparatus according to claim 1, wherein the control section is further configured to:

determine the first communication terminal and the second communication terminal are connected to one of a same base station or proximate base stations; and confirm that the first communication terminal and the second communication terminal are in vicinity of each other, based on the determination that the first communication terminal and the second communication terminal are connected to one of the same base station or the proximate base stations.

3. The control apparatus according to claim 1, wherein the confirmation request comprises first information associated with confirmation of the direct communication between the first communication terminal and the second communication terminal, and the first information includes second information associated with the direct communication wireless system and identification information of the second communication terminal.

4. The control apparatus according to claim 3, wherein the confirmation request further includes timing information that indicates a communication timing to confirm the possibility of the direct communication between the first communication terminal and the second communication terminal.

5. The control apparatus according to claim 3, wherein the confirmation request further includes a parameter unique to the direct communication wireless system.

6. The control apparatus according to claim 1, wherein the switch request includes first information associated with the direct communication wireless system and identification information of the second communication terminal.

7. The control apparatus according to claim 6, wherein the switch request includes a parameter unique to the direct communication wireless system.

8. The control apparatus according to claim 6, wherein the base unit simultaneously connects with a base station, and the switch request includes second information associated with the determination of the base unit.

9. A communication system, comprising:

a first communication terminal comprising a first control section; and a control apparatus comprising a second control section, wherein the second control section is configured to:

receive, from the first communication terminal, a connection request for a direct communication with a second communication terminal;

select a direct communication wireless system common to the first communication terminal and the second communication terminal;

transmit a confirmation request to the first communication terminal and the second communication terminal based on the selection of the direct communication wireless system, wherein the first control section is configured to:

receive, from the control apparatus, the confirmation request that indicates confirmation of possibility of the direct communication between the first communication terminal and the second communication terminal;

determine, based on the confirmation request, a confirmation result that indicates the possibility of the direct communication between the first communication terminal and the second communication terminal;

transmit the confirmation result to the control apparatus, wherein the second control section is further configured to:

receive the confirmation result from at least one of the first communication terminal or the second communication terminal;

select, as a base unit, one of the first communication terminal or the second communication terminal based on a sum of a plurality of numerical values, wherein the plurality of numerical values is based on a number of a plurality of direct communication wireless systems that supports the direct communication between the first communication terminal and the second communication terminal, a state of connection between the first communication terminal and the second communication terminal, and a battery level of each of the first communication terminal and the second communication terminal; and transmit, based on the possibility of the direct communication and the selected base unit, a switch request to switch to the direct communication between the first communication terminal and the second communication terminal, wherein the first control section is further configured to:

receive, from the control apparatus, the switch request; and switch the first communication terminal to the direct communication with the second communication terminal based on the switch request.

10. The communication system according to claim 9, wherein the confirmation request comprises first information associated with the confirmation of the possibility of the direct communication between the first communication terminal and the second communication terminal, and the first information includes second information associated with the direct communication wireless system and identification information of the second communication terminal.

11. The communication system according to claim 9, wherein the switch request includes first information associated with the direct communication wireless system and identification information of the second communication terminal.

12. The communication system according to claim 11, wherein the base unit simultaneously connects with a base station.

* * * * *